(12) United States Patent
Bykampadi et al.

(10) Patent No.: US 11,924,641 B2
(45) Date of Patent: Mar. 5, 2024

(54) SECURITY MANAGEMENT FOR SERVICE ACCESS IN A COMMUNICATION SYSTEM

(71) Applicant: Nokia Technologies Oy, Espoo (FI)

(72) Inventors: Nagendra S Bykampadi, Bangalore (IN); Tuomas Niemelä, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 16 days.

(21) Appl. No.: 17/253,190

(22) PCT Filed: Jun. 19, 2019

(86) PCT No.: PCT/FI2019/050475
§ 371 (c)(1),
(2) Date: Dec. 17, 2020

(87) PCT Pub. No.: WO2020/002764
PCT Pub. Date: Jan. 2, 2020

(65) Prior Publication Data
US 2021/0258788 A1 Aug. 19, 2021

(30) Foreign Application Priority Data
Jun. 29, 2018 (IN) .............................. 201841024429

(51) Int. Cl.
*H04W 12/084* (2021.01)
*H04L 9/40* (2022.01)
*H04L 29/06* (2006.01)

(52) U.S. Cl.
CPC ....... *H04W 12/084* (2021.01); *H04L 63/0807* (2013.01)

(58) Field of Classification Search
CPC .. H04W 12/084; H04L 63/0807; H04L 67/51; H04L 67/1001; H04L 67/02; H04L 2209/80; H04L 9/3213; G06F 21/6218; G06F 21/335
See application file for complete search history.

(56) References Cited

U.S. PATENT DOCUMENTS

| 7,483,438 B2 | 1/2009 | Serghi et al. |
| 8,402,525 B1 | 3/2013 | Shah et al. |

(Continued)

FOREIGN PATENT DOCUMENTS

| CN | 104255007 A | 12/2014 |
| CN | 105765944 A | 7/2016 |

(Continued)

OTHER PUBLICATIONS

China Mobile "Security of service based architecture of 5G phase 1" published on May 21-25, 2018 (Year: 2018).*

(Continued)

*Primary Examiner* — Khalid M Almaghayreh
(74) *Attorney, Agent, or Firm* — Ryan, Mason & Lewis, LLP

(57) ABSTRACT

An authorization entity in a communication system comprising a service-based architecture receives a request from a service consumer in the communication system for access to a given service type. The authorization entity obtains an access token that identifies a plurality of service producers for the given service type and sends the access token to the service consumer.

20 Claims, 5 Drawing Sheets

(56) References Cited

U.S. PATENT DOCUMENTS

| | | | |
|---|---|---|---|
| 2006/0041669 A1* | 2/2006 | Bemmel | H04L 63/0807 709/229 |
| 2008/0076425 A1* | 3/2008 | Khetawat | H04W 12/069 455/436 |
| 2014/0095865 A1* | 4/2014 | Yerra | H04L 9/3271 713/156 |
| 2015/0128237 A1* | 5/2015 | Lund | H04L 9/32 726/7 |
| 2015/0150106 A1* | 5/2015 | Lund | H04L 63/083 726/7 |
| 2015/0295905 A1* | 10/2015 | Leicher | H04W 12/069 726/4 |
| 2016/0127894 A1* | 5/2016 | Kahn | H04L 63/0428 380/270 |
| 2017/0142108 A1* | 5/2017 | Zhang | H04L 63/0807 |
| 2017/0289197 A1* | 10/2017 | Mandyam | H04L 63/0428 |
| 2018/0041491 A1 | 2/2018 | Gupta et al. | |
| 2018/0083977 A1* | 3/2018 | Murugesan | G06F 3/0482 |
| 2018/0183802 A1* | 6/2018 | Choyi | H04L 63/205 |
| 2018/0198824 A1* | 7/2018 | Pulapaka | H04L 41/5025 |
| 2018/0270877 A1* | 9/2018 | Lee | H04W 48/16 |
| 2018/0302391 A1* | 10/2018 | Jones | G06F 16/284 |
| 2019/0007794 A1* | 1/2019 | Thakur | H04W 4/023 |
| 2019/0021064 A1* | 1/2019 | Ryu | H04W 60/06 |
| 2019/0372766 A1* | 12/2019 | Bahrenburg | G06F 21/6272 |

FOREIGN PATENT DOCUMENTS

| | | | | |
|---|---|---|---|---|
| CN | 107005605 A | 8/2017 | | |
| CN | 108200099 A | 6/2018 | | |
| KR | 20140050121 A | 4/2014 | | |
| WO | WO-2018140384 A1 * | 8/2018 | | H04W 8/20 |

OTHER PUBLICATIONS

Extended European Search Report received for corresponding European Patent Application No. 19827138.9, dated Mar. 11, 2022, 10 pages.

"Addition of multiple instance IIIs to 0Auth2.0 access token claims", 3GPP TSG-SA WG3 Meeting #92-ad hoc, S3-183090, Ericsson, Sep. 24-28, 2018, 5 pages.

"3rd Generation Partnership Project; Technical Specification Group Services and System Aspects; Security architecture and procedures for 5G system (Release 15)", 3GPP TS 33.501, V15.0.0, Mar. 2018, pp. 1-128.

"3rd Generation Partnership Project; Technical Specification Group Services and System Aspects; Procedures for the 5G System; Stage 2 (Release 15)", 3GPP TS 23.502, V15.2.0, Jun. 2018, pp. 1-308.

Jones et al., "JSON Web Token (JWT)", Internet Engineering Task Force, RFC 7519, May 2015, pp. 1-30.

"3rd Generation Partnership Project; Technical Specification Group Services and System Aspects; System Architecture for the 5G System; Stage 2 (Release 15)", 3GPP TS 23.501, V15.0.0, Dec. 2017, pp. 1-181.

"3rd Generation Partnership Project; Technical Specification Group Services and System Aspects; Security architecture and procedures for 5G system (Release 15)", 3GPP TS 33.501, V15.1.0, Jun. 2018, pp. 1-152.

International Search Report and Written Opinion received for corresponding Patent Cooperation Treaty Application No. PCT/FI2019/050475, dated Sep. 26, 2019, 14 pages.

"Editor's Note on per UE subscription level authorization in NRF", 3GPP TSG SA3 Meeting #91, S3-181385, Nokia, Apr. 16-20, 2018, 8 pages.

"OAuth based service authorization framework for SBA", 3GPP TSG SA WG3 (Security) Meeting #89, S3-17xxxx, Agenda Item: 7.2.13, Nokia, Nov. 27-Dec. 1, 2017, 7 pages.

India Examination Report issued by the India Patent Office dated Sep. 19, 2022 for India Patent Application No. 201841024429 which is a counterpart application of U.S. Appl. No. 17/043,971, to which the current application claims priority.

Chinese Office Action in Application No. 201980043678.9, dated Dec. 26, 2023, 12 pages.

Huawei et al., "Verification of Claims in the Token during Service Access Request," 3GPP TSG-SA WG3 Meeting #91, Belgrade, S3-181205, Apr. 16-20, 2018, 4 pages.

* cited by examiner

```
{
  "iss": "NRF Identity",
  "sub": "NF Consumer Identity",
  "aud": [
      {"NF Id": "NF Producer 1", "Address": "NF Producer 1 address"},
      {"NF Id": "NF Producer 2", "Address": "NF Producer 2 address"},
      {"NF Id": "NF Producer 3", "Address": "NF Producer 3 address"}
  ],
  "..."
}
```

SECURITY MANAGEMENT FOR SERVICE ACCESS IN A COMMUNICATION SYSTEM

RELATED APPLICATION

This application claims priority to PCT Application No. PCT/FI2019/050475, filed on Jun. 19, 2019, which claims priority to India Application No. 201841024429, filed on Jun. 29, 2018, each of which is incorporated herein by reference in its entirety.

FIELD

The field relates generally to communication systems, and more particularly, but not exclusively, to security management within such systems.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

In an example communication system, user equipment (5G UE in a 5G network or, more broadly, a UE) such as a mobile terminal (subscriber) communicates over an air interface with a base station or access point referred to as a gNB in a 5G network. The access point (e.g., gNB) is illustratively part of an access network of the communication system. For example, in a 5G network, the access network is referred to as a 5G System and is described in 5G Technical Specification (TS) 23.501, V15.0.0, entitled "Technical Specification Group Services and System Aspects; System Architecture for the 5G System," the disclosure of which is incorporated by reference herein in its entirety. In general, the access point (e.g., gNB) provides access for the UE to a core network (CN), which then provides access for the UE to other UEs and/or a data network such as a packet data network (e.g., Internet).

TS 23.501 goes on to define a 5G Service-Based Architecture (SBA) which models services as network functions (NFs) that communicate with each other using representational state transfer application programming interfaces (Restful APIs).

Furthermore, 5G Technical Specification (TS) 33.501, V15.1.0, entitled "Technical Specification Group Services and System Aspects; Security Architecture and Procedures for the 5G System," the disclosure of which is incorporated by reference herein in its entirety, further describes security management details associated with a 5G network.

Security management is an important consideration in any communication system. For example, authorization of access to services is one example of security management in a 5G network. However, service access authorization presents several challenges in existing 5G approaches.

SUMMARY

Illustrative embodiments provide improved techniques for security management in communication systems particularly with respect to service access authorization.

For example, in one illustrative embodiment, a method comprises the following steps. An authorization entity in a communication system comprising a service-based architecture receives a request from a service consumer in the communication system for access to a given service type. The authorization entity obtains an access token that identifies a plurality of service producers for the given service type and sends the access token to the service consumer.

In another embodiment, a method comprises the following steps. A service consumer in a communication system comprising a service-based architecture sends to an authorization entity in the communication system a request for access to a given service type. The service consumer receives an access token from the authorization entity, wherein the access token identifies a plurality of service producers in the communication system for the given service type. One of the plurality of service producers from the access token is selected based on one or more selection criterion.

In a further embodiment, a method comprises the following steps. A proxy element in a communication system comprising a service-based architecture receives an access token, wherein the access token identifies a plurality of service producers in the communication system for a given service type generated by an authorization entity in the communication system in response to a request by a service consumer in the communication system for access to the given service type. One of the plurality of service producers from the access token is selected at the proxy element based on one or more selection criterion. In an additional embodiment, the proxy element sends the service consumer identifying information for the selected service producer to the service consumer.

In yet another embodiment, a method comprises the following steps. An access token is received at a service consumer in a communication system comprising a service-based architecture from an authorization entity, wherein the access token identifies a plurality of proxy elements corresponding to service producers in the communication system for a given service type. The service consumer selects one of the plurality of proxy elements from the access token and sends a request to access the given service type to the selected proxy element.

Further illustrative embodiments are provided in the form of non-transitory computer-readable storage medium having embodied therein executable program code that when executed by a processor causes the processor to perform the above steps. Still further illustrative embodiments comprise apparatus with a processor and a memory configured to perform the above steps.

These and other features and advantages of embodiments described herein will become more apparent from the accompanying drawings and the following detailed description.

DETAILED DESCRIPTION

Embodiments will be illustrated herein in conjunction with example communication systems and associated techniques for providing security management in communication systems. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP next generation system (5G), the disclosed embodiments can be adapted in a straightforward manner to a variety of other types of communication systems.

In accordance with illustrative embodiments implemented in a 5G communication system environment, one or more 3GPP technical specifications (TS) and technical reports (TR) provide further explanation of network elements/functions and/or operations that interact with one or more illustrative embodiments, e.g., the above-referenced 3GPP TS 23.501 and 3GPP TS 33.501. Other 3GPP TS/TR documents provide other conventional details that one of ordinary skill in the art will realize. However, while well-suited for 5G-related 3GPP standards, embodiments are not necessarily intended to be limited to any particular standards.

Illustrative embodiments are related to security management associated with the Service-Based Architecture (SBA) for 5G networks. Prior to describing such illustrative embodiments, a general description of main components of a 5G network will be described below in the context of FIGS. 1 and 2.

Figure 1:
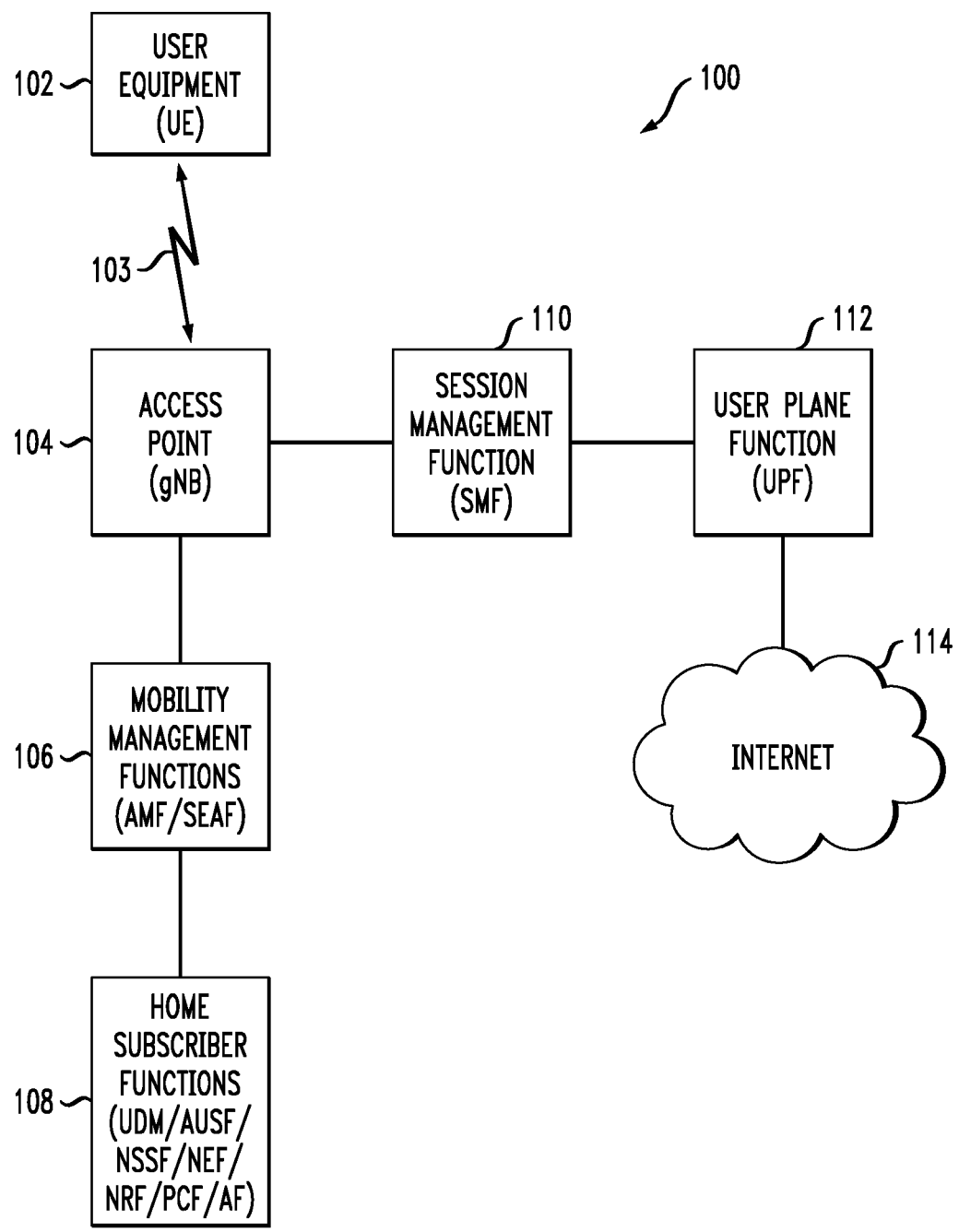
FIG. 1 illustrates a communication system with which one or more illustrative embodiments may be implemented.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in 5G networks that provide these main functions. However, other network elements are used in other embodiments to implement some or all of the main functions represented. Also, it is to be understood that not all functions of a 5G network are depicted in FIG. 1. Rather, functions that facilitate an explanation of illustrative embodiments are represented. Subsequent figures depict some additional elements/functions.

Accordingly, as shown, communication system 100 comprises user equipment (UE) 102 that communicates via an air interface 103 with an access point (gNB) 104. The UE 102 in some embodiments is a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment such as a smart phone. Such communication devices are also intended to encompass devices commonly referred to as access terminals.

In one embodiment, UE 102 is comprised of a Universal Integrated Circuit Card (UICC) part and a Mobile Equipment (ME) part. The UICC is the user-dependent part of the UE and contains at least one Universal Subscriber Identity Module (USIM) and appropriate application software. The USIM securely stores the permanent subscription identifier and its related key, which are used to identify and authenticate subscribers to access networks. The ME is the user-independent part of the UE and contains terminal equipment (TE) functions and various mobile termination (MT) functions.

Note that, in one example, the permanent subscription identifier is an International Mobile Subscriber Identity (IMSI) of a UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN). In a 5G communication system, an IMSI is referred to as a Subscription Permanent Identifier (SUPI). In the case of an IMSI as a SUPI, the MSIN provides the subscriber identity. Thus, only the MSIN portion of the IMSI typically needs to be encrypted. The MNC and MCC portions of the IMSI provide routing information, used by the serving network to route to the correct home network. When the MSIN of a SUPI is encrypted, it is referred to as Subscription Concealed Identifier (SUCI).

The access point 104 is illustratively part of an access network of the communication system 100. Such an access network comprises, for example, a 5G System having a plurality of base stations and one or more associated radio network control functions. The base stations and radio network control functions in some embodiments are logically separate entities, but in some embodiments are implemented in the same physical network element, such as, for example, a base station router or femto cellular access point.

The access point 104 in this illustrative embodiment is operatively coupled to mobility management functions 106. In a 5G network, the mobility management function is implemented by an Access and Mobility Management Function (AMF). A Security Anchor Function (SEAF) in some embodiments is also implemented with the AMF connecting a UE with the mobility management function. A mobility management function, as used herein, is the element or function (i.e., entity) in the core network (CN) part of the communication system that manages or otherwise participates in, among other network operations, access and mobility (including authentication/authorization) operations with the UE (through the access point 104). The AMF is also referred to herein, more generally, as an access and mobility management entity.

The AMF 106 in this illustrative embodiment is operatively coupled to home subscriber functions 108, i.e., one or more functions that are resident in the home network of the subscriber. As shown, some of these functions include the Unified Data Management (UDM) function, as well as an Authentication Server Function (AUSF). The AUSF and UDM (separately or collectively) are also referred to herein, more generally, as an authentication entity. In addition, home subscriber functions include, but are not limited to, Network Slice Selection Function (NSSF), Network Exposure Function (NEF), Network Function Repository Function (NRF), Policy Control Function (PCF), and Application Function (AF).

One important point to note is that in an SBA communication system, such as a 5G system, the control plane uses a services model approach in which components (NFs) query the NRF to discover and communicate with each other over application programming interfaces (APIs). The NF services discovery and authorization method will be described in further detail below.

The access point 104 is also operatively coupled to a serving gateway function, i.e., Session Management Function (SMF) 110, which is operatively coupled to a User Plane Function (UPF) 112. UPF 112 is operatively coupled to a Packet Data Network, e.g., Internet 114. Further typical operations and functions of such network elements are not described here since they are not the focus of the illustrative embodiments and can be found in appropriate 3GPP 5G documentation.

It is to be appreciated that this particular arrangement of system elements is an example only, and other types and arrangements of additional or alternative elements can be used to implement a communication system in other embodiments. For example, in other embodiments, the system 100 comprises other elements/functions not expressly shown herein.

Accordingly, the FIG. 1 arrangement is just one example configuration of a wireless cellular system, and numerous alternative configurations of system elements may be used. For example, although only single elements/functions are shown in the FIG. 1 embodiment, this is for simplicity and clarity of description only. A given alternative embodiment may of course include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of network function (NF) sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via gNB 104. NFs can also access services of other NFs.

Figure 2:
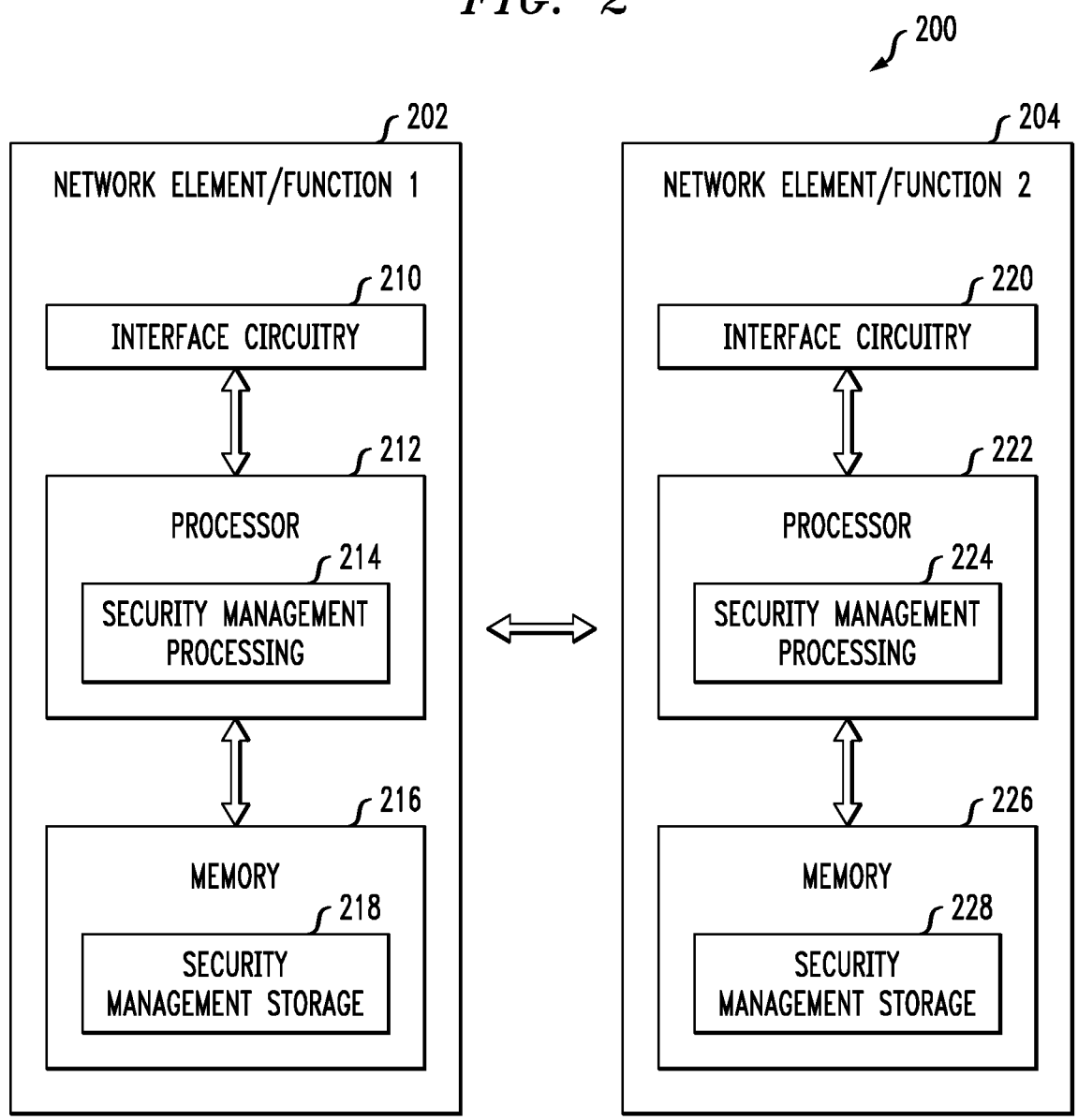
FIG. 2 illustrates network elements/functions for providing security management with which one or more illustrative embodiments may be implemented.

FIG. 2 is a block diagram of network elements/functions for providing security management in an illustrative embodiment. System 200 is shown comprising a first network element/function 202 and a second network element/function 204. It is to be appreciated that the network elements/functions 202 and 204 represent any network elements/functions that are configured to provide security management and other techniques described herein, for example, but not limited to, AMF, SEAF, UDM, AUSF, NSSF, NEF, NRF, PCF and AF.

The network element/function 202 comprises a processor 212 coupled to a memory 216 and interface circuitry 210. The processor 212 of the network element/function 202 includes a security management processing module 214 that may be implemented at least in part in the form of software executed by the processor. The processing module 214 performs security management described in conjunction with subsequent figures and otherwise herein. The memory 216 of the network element/function 202 includes a security management storage module 218 that stores data generated or otherwise used during security management operations.

The network element/function 204 comprises a processor 222 coupled to a memory 226 and interface circuitry 220. The processor 222 of the network element/function 204 includes a security management processing module 224 that may be implemented at least in part in the form of software executed by the processor 222. The processing module 224 performs security management described in conjunction with subsequent figures and otherwise herein. The memory 226 of the network element/function 204 includes a security management storage module 228 that stores data generated or otherwise used during security management operations.

The processors 212 and 222 of the respective network elements/functions 202 and 204 may comprise, for example, microprocessors, application-specific integrated circuits (ASICs), field programmable gate arrays (FPGAs), digital signal processors (DSPs) or other types of processing devices or integrated circuits, as well as portions or combinations of such elements. Such integrated circuit devices, as well as portions or combinations thereof, are examples of "circuitry" as that term is used herein. A wide variety of other arrangements of hardware and associated software or firmware may be used in implementing the illustrative embodiments.

The memories 216 and 226 of the respective network elements/functions 202 and 204 may be used to store one or more software programs that are executed by the respective processors 212 and 222 to implement at least a portion of the functionality described herein. For example, security management operations and other functionality as described in conjunction with subsequent figures and otherwise herein may be implemented in a straightforward manner using software code executed by processors 212 and 222.

A given one of the memories 216 or 226 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

The memory 216 or 226 may more particularly comprise, for example, an electronic random access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 210 and 220 of the respective network elements/functions 202 and 204 illustratively comprise transceivers or other communication hardware or firmware that allows the associated system elements to communicate with one another in the manner described herein.

It is apparent from FIG. 2 that network element/function 202 is configured for communication with network element/function 204 and vice-versa via their respective interface circuitries 210 and 220. This communication involves network element/function 202 sending data to the network element/function 204, and the network element/function 204 sending data to the network element/function 202. However, in alternative embodiments, other network elements may be operatively coupled between the network elements/functions 202 and 204. The term "data" as used herein is intended to be construed broadly, so as to encompass any type of information that may be sent between network elements/functions (as well as between user equipment and a core network) including, but not limited to, messages, identifiers, keys, indicators, user data, control data, etc.

Thus, in one example, network element/function 202 is a NF, such as an AMF, and network element/function 204 is an NRF. In such case, the AMF and the NRF participate in a service access authorization methodology (discovery and selection) and exchange messages/data as needed. Such service access authorization methodology will be further described below.

It is to be appreciated that the particular arrangement of components shown in FIG. 2 is an example only, and numerous alternative configurations are used in other embodiments. For example, any given network element/function can be configured to incorporate additional or alternative components and to support other communication protocols.

Other system elements such as UE 102 and gNB 104 may each also be configured to include components such as a processor, memory and network interface. These elements need not be implemented on separate stand-alone processing platforms, but could instead, for example, represent different functional portions of a single common processing platform.

Given the general concepts described above, illustrative embodiments that address certain security management issues will now be described. More particularly, illustrative embodiments provide security management techniques for 5G systems. The architecture for 5G systems is currently being standardized in 3GPP. As mentioned above, the 3GPP TS 23.501 defines the 5G system architecture as service-based, e.g., Service-Based Architecture (SBA).

Figure 3:
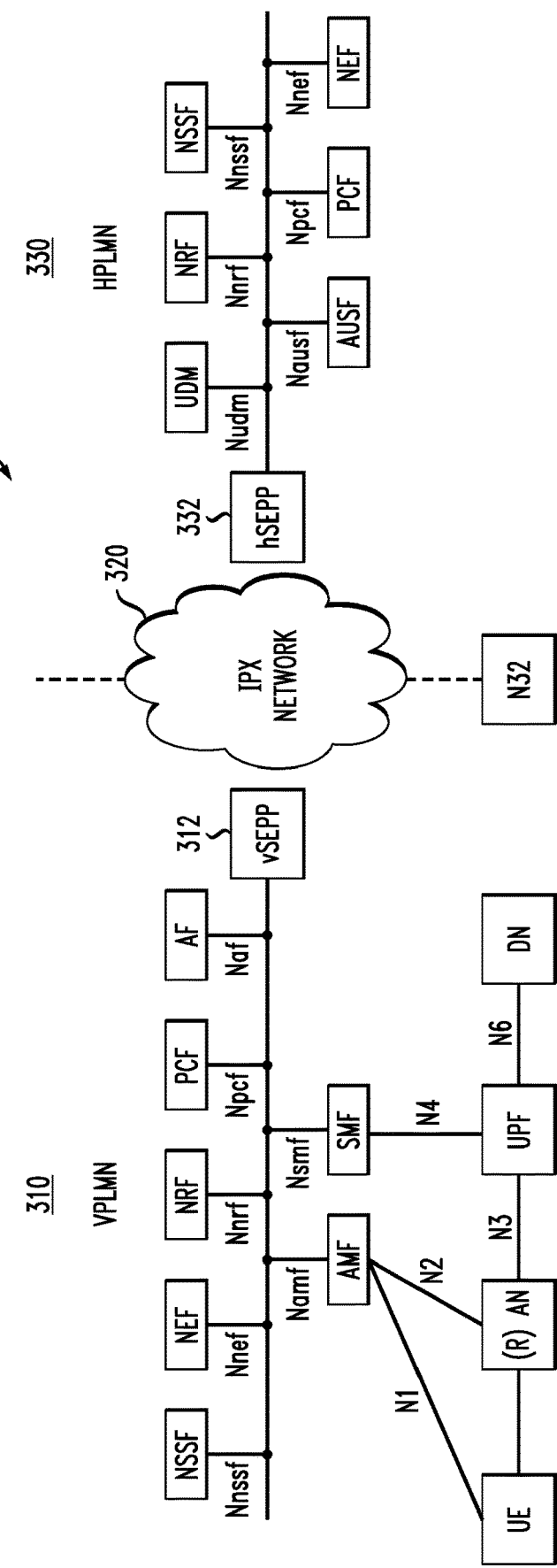
FIG. 3 illustrates a communication system architecture with network functions interacting between and within a visited network and a home network with which one or more illustrative embodiments may be implemented.

FIG. 3 depicts a 5G architecture 300 in a configuration comprising a visited public land mobile network (VPLMN) 310 operatively coupled via an intermediate Internetwork Packet Exchange (IPX) network 320 to a home public land mobile network (HPLMN) 330. Note that there can be more than one IPX network operatively coupled between VPLMN 310 and HPLMN 330. FIG. 3 also illustrates the presence of a Security Edge Protection Proxy (SEPP) at the edge of each PLMN, i.e., vSEPP 312 in VPLMN 310 and hSEPP 332 in HPLMN 330. It is to be appreciated that the various network functions shown in the VPLMN 310 and the HPLMN 330 are known and described in detail in various 5G specifications such as, but not limited to, the above-referenced TS 23.501 and TS 33.501.

As mentioned above, in 5G, SBA is introduced to model services as network functions (NFs) that communicate with each other using Restful application programming interfaces (Representational State Transfer APIs). In the scenario where the two communicating NFs are in two different PLMNs (e.g., VPLMN 310 and HPLMN 330), communication happens over a roaming inter-network interface (N32) between the two participating PLMNs.

To protect NF specific content in the messages that are sent over the roaming inter-network interface, 5G introduces the SEPP as the entity residing at the perimeter of the PLMN network to protect the PLMN from outside traffic and additionally to implement transport layer security (TLS) and application layer security (ALS) for all the data and signalling exchanged between two inter-network network functions at the service layer. For example, the SEPP performs security management functions on information elements (IE) in HyperText Transport Protocol (HTTP) messages before the messages are sent externally over the roaming N32 interface. The protected HTTP messages are referred to as N32 messages. Protection such as ALS involves protecting information sent in various parts of the HTTP message including, but not limited to, HTTP Request/Response Line, HTTP header and HTTP Payload. However, some parts of this message may need to be modified by intermediaries (e.g., network provider of IPX 330 as shown in FIG. 3) between the two SEPPs.

Thus, in 5G SBA, the PLMN operator deploys a SEPP at the edge of its network to interoperate and obtain services from network functions in its roaming partner networks. The SEPP interfaces with one or more other SEPPs in one or more other networks over the N32 interface. As an edge proxy, the SEPP implements ALS as mentioned above to protect HTTP messages exchanged between a network function in its network and another network function in the roaming partner network.

While two NFs can be in different PLMNs as FIG. 3 illustrates, some NFs in the same PLMN also have a need to communicate. In either scenario (inter-PLMN communication or intra-PLMN communication), the SBA communication model includes security methods that enable an "NF service consumer" (service client) to be authenticated and authorized to access a service provided by or otherwise associated with an "NF service producer" (service server). One of the supported authorization methods in the above-referenced 3GPP TS 33.501 (Release 15) is based on the OAuth 2.0 access token methodology. In a 5G system, the following model is adopted when OAuth 2.0 is used: (i) the NRF is the OAuth 2.0 authorization server; (ii) the NF service consumer is the OAuth 2.0 client; and (iii) the NF service producer is the OAuth 2.0 resource server.

The NF service consumer (client) discovers the NF service producer (resource server) via the NRF, and then obtains an access token to present to the NF service producer when invoking the service API request. In existing approaches (as described in the above-referenced 3GPP TS 33.501 (Release 15)), the access token is bound to the specific NF producer instance that is selected by the NRF or the NF service consumer at the end of the discovery process.

Illustrative embodiments realize that by binding the access token to a particular single NF producer instance, selection logic is prevented from selecting from a pool of NF producer instances. Illustrative embodiments further realize that selection from a pool of instances is relevant for cases where the currently used instance fails, or when there is a desire to rapidly select a different instance for load balancing purposes, or in the case of an intermediary proxy entity that would do the selection on behalf of the NF service consumer. In addition, illustrative embodiments realize that having a 1:1 association between the access token and NF producer instance is sub-optimal as it forces the NF consumer to obtain a new token every time there is a change in the service producer. In fact, the current 3GPP standardized solution requires the NF service consumer to fetch a new access token for each service request and such access token is per each NF producer instance from which it wants to obtain services. See the above-referenced 3GPP TS 33.501, Clause 13.4.

As will be further explained in detail herein, illustrative embodiments provide for improved service access authorization that enables service selection logic to select from two or more NF producer instances. For example, in one embodiment, the NRF generates a JavaScript Object Notation (JSON) Web Token based access token and populates the audience claim field in the token with end-point addresses (i.e., uniform resource locators or URLs) for the set of discovered producer NF instance(s) or producer NF service instance(s). The NRF returns the generated token when the NF service consumer requests an access token after the discovery step. NF selection logic uses the audience claim field to select a producer NF instance based on various factors such as, but not limited to, load balancing.

Figure 4:
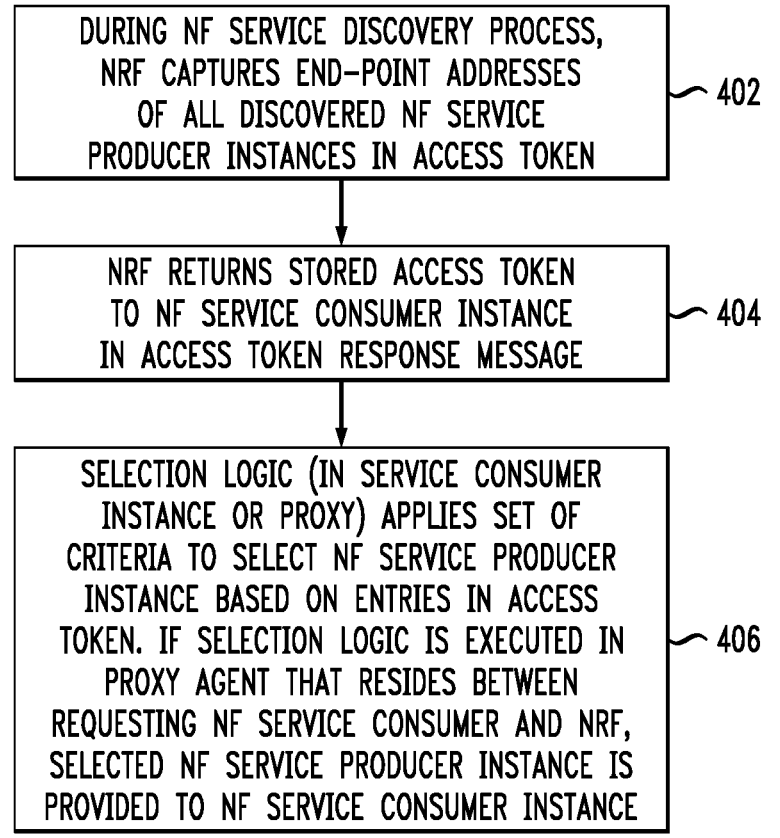
FIG. 4 illustrates a methodology for service access authorization in a communication system, according to an illustrative embodiment.

FIG. 4 illustrates an example of the overall process as methodology 400.

As shown in step 402, during the NF service discovery process, the NRF captures end-point addresses of all the discovered NF service producer instances in the access token.

In step 404, the NRF returns the stored access token to the NF service consumer instance in an access token response message.

In step 406, selection logic (in the NF service consumer or a proxy, as will be further explained below) applies a set of criteria to select an NF service producer instance based on the entries in the access token. If the selection logic is implemented in the proxy, the proxy may provide selected producer instance's address to the NF service consumer instance.

Each of steps 402, 404, and 406 will now be described in further detail.

Capturing all discovered NF service producer instances in the access token (step 402). As part of the discovery procedure, the NRF determines the discovered NF instance(s) or NF service instance(s) and provides the information of a set of discovered NF instance(s) or NF service instance(s) to the NF service consumer via Nnrf_NFDiscovery_Request Response message. The information includes: FQDN (fully qualified domain name), IP (Internet Protocol) address, or end-point addresses (i.e., URLs) for the set of discovered NF instance(s) or NF service instance(s). Details of the discovery process are further described in Clause 4.17.4 5G Technical Specification (TS) 23.502, V15.2.0, entitled "Technical Specification Group Services and System Aspects; Procedures for the 5G System, Stage 2" the disclosure of which is incorporated by reference herein in its entirety.

Figure 5:
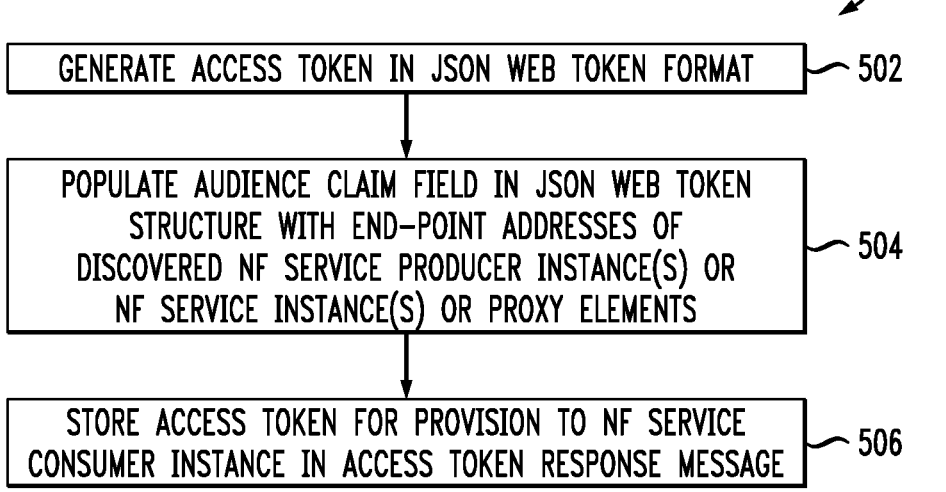
FIG. 5 illustrates a methodology for generating an access token for use in service access authorization in a communication system, according to an illustrative embodiment.

FIG. 5 illustrates a methodology 500 with additional steps that the NRF performs as part of the discovery procedure according to an illustrative embodiment.

In step 502, the NRF generates an access token in the JSON Web Token (JWT) format as described in Internet Engineering Task Force (IETF) Request for Comments (RFC) 7519, "JSON Web Token (JWT)," May 2015, the disclosure of which is incorporated by reference herein in its entirety. As will be explained, this format is modified to include a plurality of discovered service producers as per the next step.

In step 504, the NRF populates the audience claim field in the JSON Web Token structure with the end-point addresses of all the discovered NF service producer instance(s) or NF service instance(s). In another embodiment, as will be further explained below, the access token can alternatively store end-point addresses of proxy elements corresponding to NF service producer instances.

In step 506, the NRF stores the access token so that it can be provided to the NF service consumer instance in the access token response message (step 404).

Figures 6, 7:
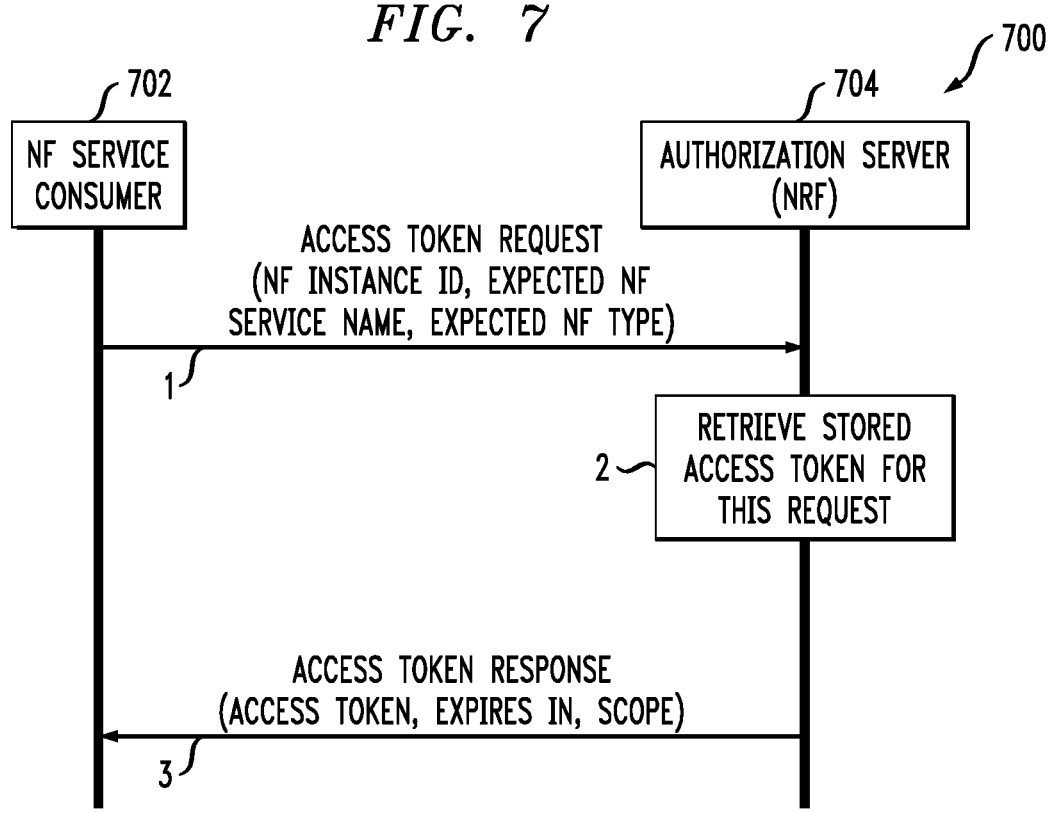
FIG. 6 illustrates at least a portion of an access token for use in service access authorization in a communication system, according to an illustrative embodiment.
FIG. 7 illustrates a methodology for service discovery in a communication system, according to an illustrative embodiment.

FIG. 6 illustrates at least a portion of a JSON Web Token (JWT) 600 and specifically how the audience claim field is used to capture addresses of the discovered NF producer instances with the access token. As shown, JWT 600 comprises an NRF identity field 602 (identifies the NRF that generates the access token), NF consumer identity 604 (identifies the NF requesting access token), and an audience claim field 606 with a plurality of NF producer identities and addresses.

In the embodiment example shown in FIG. 6, the audience claim is an array with each element of the array comprising the NF Instance Id (identity) and the end-point address of the discovered producer instance. Alternative embodiments are possible on how the audience claim is formatted.

NRF returns the stored access token request in the Access Token Response message (step 404). Clause 13.4.1.1 of the above-referenced 3GPP TS 33.501 describes a procedure for obtaining an access token from the NRF. This is executed by the Consumer NF Instance before service access. Illustrative embodiments provide, inter alia, the following changes to the existing procedure:

1) When the NRF receives the Access Token Request message from the NF Instance Id (service consumer Id) that was already authorized in the discovery step for a particular target NF type and service name, the NRF skips reauthorizing the NF service consumer instance again (which is step 2 in the existing procedure).

2) The NRF retrieves the access token that is generated during the discovery process for this NF Instance Id (step 402) and provides it in an Access Token Response.

As described above in the context of step 402, the access token is populated with all necessary information of the discovered NF service producer instances.

FIG. 7 illustrates a modified message flow for a service discovery methodology 700 according to an illustrative embodiment. More particularly, as shown in step 1, the NF service consumer 702 sends an Access Token Request to the NRF (Authorization Server) 704. The Access Token Request comprises NF Instance ID, Expected NF service name, and Expected NF service type. In step 2, the NRF 704 retrieves the stored access token for this request. Then, in step 3, the NRF 704 sends an Access Token Response to the NF service consumer 702 which comprises access token, expiration time for the token, and scope of the token).

Selection logic selects a NF service producer instance (step 406). The NF service consumer instance receives the Access Token Response message with the access token included. The NF service consumer instance then applies a set of evaluation factors to determine which NF service producer instance to use for the service request. The NF service consumer executes a service request API to obtain the service from the selected NF service producer instance. The access token is included in the request. Note that the selection logic in some embodiments is part of the NF service consumer instance, while in other embodiments the selection logic is part of a proxy element.

Given the above illustrative descriptions, some illustrative embodiments are further described below.

1. Service Based Architecture (Release 15 of TS 33.501) where selection is performed by the NF service consumer instance. This is a Rel-15 model in which the NF service consumer obtains an access token from the NRF obtaining service from a selected NF producer instance and includes this token in the API service request addressed to the NF service producer instance. The implementation allows the NF service consumer to use one access token to obtain service from more than one eligible NF service producer instances.

2. In an architecture where a Proxy acts as a hub for all or some of the service layer messages between NFs within the PLMN.

a. The proxy is the entity that selects an NF service producer from the list of NF service producers provided by the NRF in the NF service discovery response. Proxy functionality in some embodiments also resides in the NRF itself or has a proprietary interface to the NRF. The NRF provides this information to the NF service consumer in the NF service discovery response message.

b. The NF service consumer includes the obtained access token in the API service request addressed to the NF service producer instance.

c. The proxy in some embodiments applies load balancing on the API service request which could result in a new NF producer instance being selected by the proxy from the list of NF producer instances present in the access token. The proxy in some embodiments also selects the NF producer instance based on reasons other than load balancing.

d. The proxy routes the service request to the selected NF service producer instance.

3. In the architecture where the Proxy is only between NF service consumers and NF service producers. In this model, the proxy does not exist between the NF service consumer and the NRF. That is, the proxy only listens to communication between two NFs.

Thus, in some embodiments, the proxy receives the access token from the service consumer and not from the NRF.

As in scenario 2c. above, the proxy in some embodiments applies load balancing, or some other selection related functionality, on the API service request by changing the selection made by the NF service consumer based on information in the access token.

In an alternative embodiment, as mentioned above in step 504 of FIG. 5, rather than the access token storing end-point addresses of the service producers, the NRF can generate an access token that stores end-point addresses of the proxy elements. This embodiment is useful when, for example, a proxy sits between the two NFs (service consumer and service producer) and the service producer address is not externally visible. The proxy is used as a gatekeeper to one or more service producer instances in the backend. Thus, in this alternative model, the NRF populates the audience claim field with the end-point addresses of proxy agents (elements). The NF service consumer selects one address and sends the message to the proxy. The proxy then selects the service producer instance.

Thus, advantageously, in this model, the service consumer communicates with the proxy element associated with the service producer. In other words, there is no direct connection between the service consumer and the selected service producer. Connection goes through a proxy. Further, in this model, the proxy has an option to change the selected producer based on load balancing criteria or other criteria. The proxy uses the audience claim field in the access token to select a different service producer.

In other embodiments, a proxy element may reside in the NRF, in the NF service consumer, and/or in one or more NF service producers.

In addition to load balancing criterion being used for service producer selection criteria, other criteria such as availability (e.g., the service producer has become unavailable/faulty) and/or planned maintenance (e.g., for software upgrade) can be used. Further, in some embodiments, the selection criteria comprise one or more operator configured policy criterion.

It should therefore again be emphasized that the various embodiments described herein are presented by way of illustrative example only and should not be construed as limiting the scope of the claims. For example, alternative embodiments can utilize different communication system configurations, user equipment configurations, base station configurations, key pair provisioning and usage processes, messaging protocols and message formats than those described above in the context of the illustrative embodiments. These and numerous other alternative embodiments within the scope of the appended claims will be readily apparent to those skilled in the art.

We claim:

1. A method comprising:
receiving at an authorization entity in a communication system comprising a service-based architecture a request from a service consumer in the communication system for access to a given service type;
obtaining at the authorization entity an access token that identifies (i) a network function repository function (NRF) of the communication system which generated the access token and (ii) a plurality of different service producers offering services of the given service type determined utilizing a discovery process performed by the NRF, the plurality of different service producers comprising network entities of the service-based architecture in the communication system; and
sending the access token from the authorization entity to the service consumer;
wherein the access token comprises an audience claim field specifying network entity instance identifiers for the plurality of different service producers.

2. The method of claim 1, further comprising the authorization entity authenticating the service consumer in the discovery process prior to receiving an access token request from the service consumer.

3. The method of claim 1, wherein the obtaining step further comprises retrieving from storage the access token generated during the discovery process.

4. The method of claim 1, wherein the authorization entity is the NRF, the service consumer is a first network function, and the plurality of different service producers are two or more other network functions.

5. The method of claim 1, wherein the access token comprises an identifier and an address for each of the plurality of different service producers identified therein.

6. The method of claim 1, wherein the access token comprises a JavaScript Object Notation Web Token format.

7. The method of claim 1, wherein the network entity instance identifiers for the plurality of different service producers in the audience claim field of the access token comprise end-point addresses for the network entities of the service-based architecture in the communication system.

8. A method comprising:
sending from a service consumer in a communication system comprising a service-based architecture to an authorization entity in the communication system a request for access to a given service type;
receiving at the service consumer an access token from the authorization entity, wherein the access token identifies (i) a network function repository function (NRF) of the communication system which generated the access token and (ii) a plurality of different service producers offering services of the given service type determined utilizing a discovery process performed by the NRF, the plurality of different service producers comprising network entities of the service-based architecture in the communication system; and
selecting at least one of the plurality of different service producers from the access token based on one or more selection criterion;
wherein the access token comprises an audience claim field specifying network entity instance identifiers for the plurality of different service producers.

9. The method of claim 8, further comprising the service consumer sending a service request to the selected service producer, wherein the service request comprises the access token.

10. The method of claim 9, wherein the service request comprises an application programming interface service request.

11. The method of claim 8, further comprising:
subsequently selecting another service producer from the same access token; and
sending a service request to the selected other service producer, wherein the service request comprises the access token.

12. A method comprising:
receiving an access token at a proxy element in a communication system comprising a service-based architecture, wherein the access token identifies (i) a network function repository function (NRF) of the communication system which generated the access token and (ii) a subset of a plurality of different service producers in the communication system offering services of a given service type which are associated with the proxy element and which are determined utilizing a discovery process performed by the NRF, the plurality of different service producers comprising network entities of the service-based architecture in the communication system, the access token being generated by an authorization entity in the communication system in response to a request by a service consumer in the communication system for access to the given service type; and
selecting at the proxy element one of the subset of the plurality of different service producers from the access token based on one or more selection criterion;
wherein the access token comprises an audience claim field specifying network entity instance identifiers for the identified subset of the plurality of different service producers.

13. The method of claim 12, further comprising, when the proxy element resides between the authorization entity and the service consumer, the proxy element sending the service consumer identifying information for the selected service producer.

14. The method of claim 12, further comprising, when the proxy element resides between the authorization entity and the service consumer, the proxy element subsequently selecting another service producer from the access token based on a change in at least one of the one or more selection criterion.

15. The method of claim 14, further comprising the proxy element sending the service consumer identifying information for the subsequently selected service producer.

16. The method of claim 12, further comprising, when the proxy element resides between the service consumer and one or more of the service producers, the proxy element sending the service consumer identifying information for the selected service producer.

17. The method of claim 16, further comprising, when the proxy element resides between the service consumer and one or more of the service producers, the proxy element subsequently selecting another service producer from the access token based on a change in at least one of the one or more selection criterion.

18. The method of claim 17, further comprising the proxy element sending the service consumer identifying information for the subsequently selected service producer.

19. The method of claim 14, wherein the selection criterion in which the change occurs comprises one or more of: a load balancing criterion; an availability criterion; and a maintenance criterion.

20. The method of claim 12, wherein the proxy element receives the access token from one of the authorization entity and the service consumer.

* * * * *